Oct. 29, 1940.  N. M. RIEGER  2,219,494
MOWER
Filed Nov. 21, 1938  2 Sheets-Sheet 1
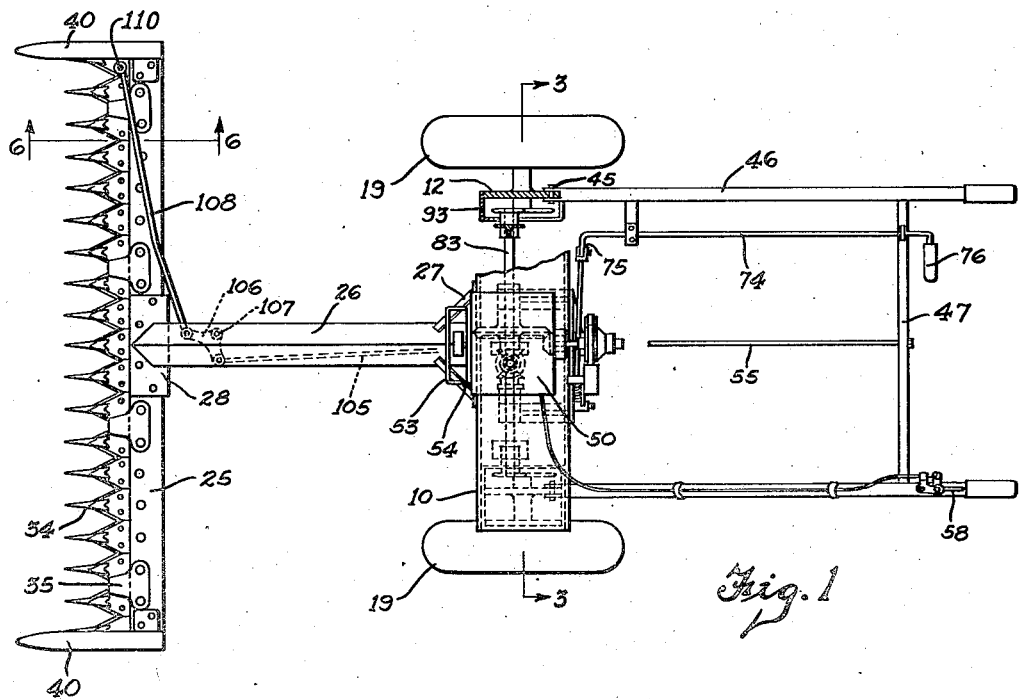
Fig. 1
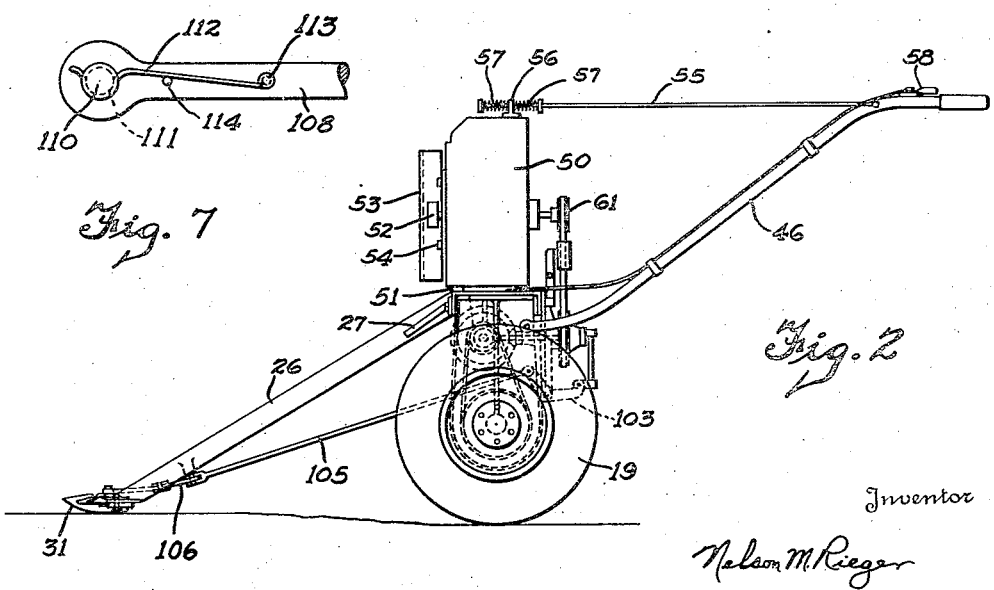
Fig. 7
Fig. 2
Inventor
Nelson M. Rieger
By
Maréchal & Hoe
Attorneys Oct. 29, 1940.    N. M. RIEGER    2,219,494
MOWER
Filed Nov. 21, 1938    2 Sheets-Sheet 2
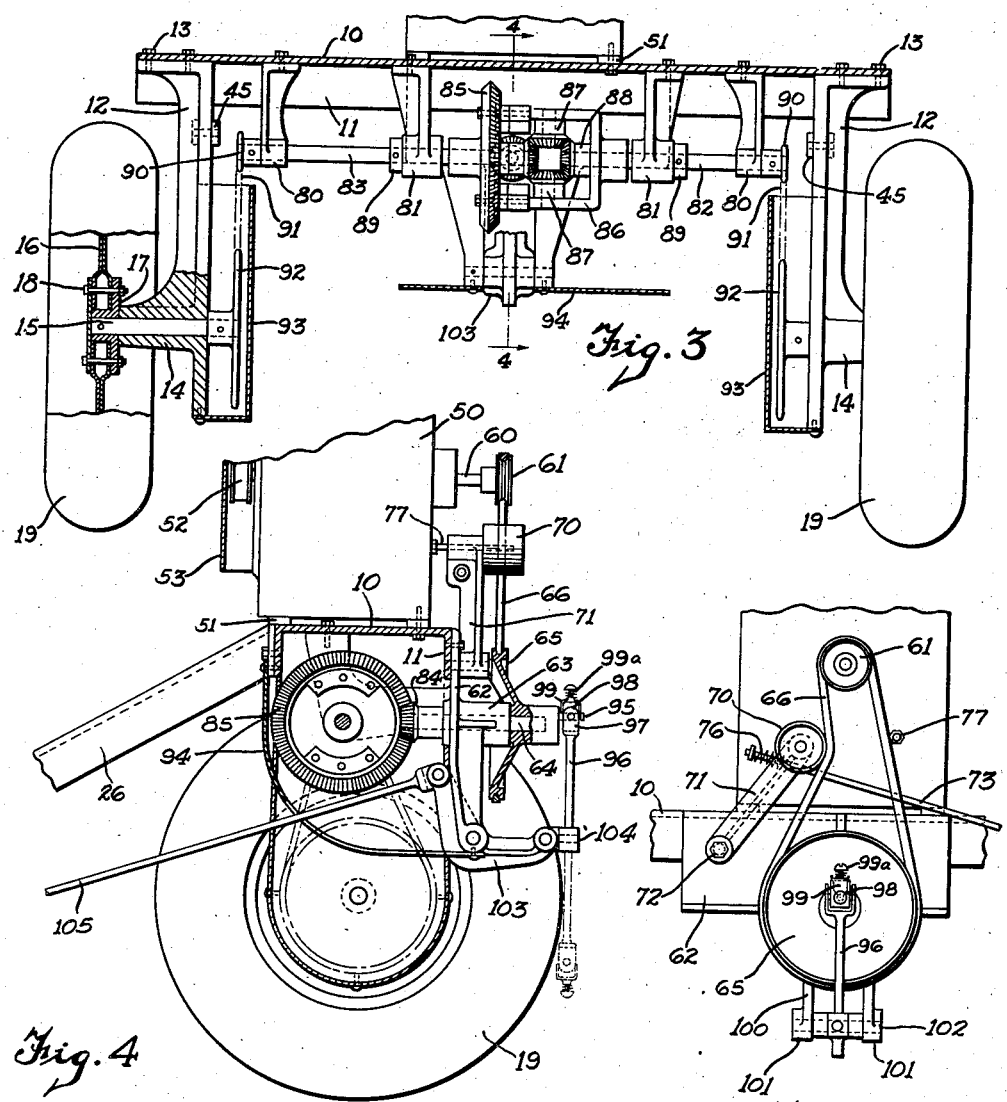
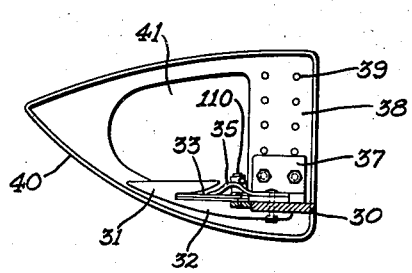
Inventor
Nelson M. Rieger
Maréchal & Noe
Attorneys Patented Oct. 29, 1940

2,219,494

UNITED STATES PATENT OFFICE 2,219,494

MOWER

Nelson M. Rieger, Dayton, Ohio

Application November 21, 1938, Serial No. 241,535

5 Claims. (Cl. 56—26.5)

This invention relates to mowers and more particularly to power operated mowing devices.

It is the principal object of the invention to provide a manually controlled power operated mower adapted to cut rapidly and uniformly through a standing growth of material without running down or bending over the uncut material on either side thereof.

It is also an object to provide a mower of this character comprising a tractor unit of standard size and arranged for convenient manual control which supports and actuates a cutter member of a width selected from a range of sizes and adapted to cut smoothly and completely to a desired width and closeness of cut.

It is a further object to provide such a mower in which the cut material is thrown to the ground in the path of the cut and the mower tends to continuously maintain itself clear of such cut material.

It is a still further object to provide such a mower which is constructed for ready assembly, repair, and adjustment, in which the several parts are so constructed and arranged as to provide for the simple and ready unitary replacement and removal thereof without disturbing the remaining parts.

Other objects and advantages will be apparent from the following description, the accompanying drawings and the appended claims.

In the drawings—

Fig. 1 is a view in plan with certain portions broken away showing a mower constructed in accordance with the present invention;

Fig. 2 is a view in side elevation of the device;

Fig. 3 is a vertical sectional view on the line 3—3 of Fig. 1;

Fig. 4 is a view in vertical section at right angles to the section 3—3, and on the line 4—4 of Fig. 3;

Fig. 5 is a partial view in rear elevation showing the detail of the drive mechanism;

Fig. 6 is a vertical sectional view through the cutter bar on the line 6—6 of Fig. 1; and Fig. 7 is a detail plan view showing the means for uncoupling the cutter bar from its drive member.

Referring to the drawings which disclose a preferred embodiment of the invention, the tractor unit comprises the main cross frame member 10 preferably in the form of an inverted channel with depending flange parts 11. Bolted to the underside of the channel 10 at either end thereof is a downwardly extending wheel bracket 12; bolts 13 provide for removably fastening the wheel brackets in assembled position. Each wheel bracket is provided with an extended portion 14 which serves as a journal for the wheel axles 15. The wheels 16 are suitably fastened to a flange carrying member 17 mounted upon the overhanging end of the axle 15, bolts 18 removably attaching each wheel to the support 17 providing for ready removal thereof when required. Pneumatic tires 19 are carried upon the outer periphery of each wheel portion 16, the wheel thus being carried outwardly of the wheel bracket and the frame member.

The cutter bar assembly 25 is mounted on and supported from the main frame 10 on the forward side thereof. The supporting means is preferably in the form of a single centrally arranged inverted V-shaped angle piece 26 suitably fastened to the frame 10 as by means of welding, and reinforced by means of reinforcing plates 27. The member 26 extends forwardly and downwardly to support the cutter bar in proper relation with respect to the ground, the cutter bar assembly being held in fixed position upon the lower end of member 26 by means of a pair of plates 28 fastened to the arm 26 and suitably bolted to the cutter bar.

The cutter bar assembly itself comprises a main cross head 30 to which are bolted in proper spaced relation, a series of forwardly projecting tongues 31 having lower curved guiding surfaces 32 upon which the cutter bar is adapted to be guided over the surface of the ground. The main frame member 30 also carries the reciprocable sickle bar 33 comprising a knife bar having a plurality of angularly related cutting surfaces, adapted to be reciprocated in cutting relation to the stationary knife blades 34. Pressure plates 35 fastened to the frame 30 and bearing upon the sickle bar tend to maintain it in proper cutting relation with respect to the fixed knives providing for free reciprocating movement thereof. In order to provide for adjustment of the cutter bar assembly to different elevations above the ground as required for cutting various different materials, L-shaped bracket plates 37 are bolted to each end of the frame member 30 and on their outer vertical face provide for receiving guide shoes 38. Each shoe is provided with series of pairs of apertures 39 by means of which the shoe can be bolted to its respective bracket 37 at a desired elevation. The lower edge 40 of each shoe is curved as shown in order to cause the guide shoe to run over obstructions occurring upon the ground, and to maintain the cutter bar at a definite predetermined level with respect to the ground. These guide shoes are preferably made of light weight metal, and are cut out as shown at 41 in order to reduce the weight thereof and to make it possible to remove the sickle knife bar 33 endwise without disturbing guide shoes 38. The provision of guide shoes makes it possible to adjust the depth of the cut over a relatively wide operating range sufficient for all normal purposes. Thus with the shoes fastened to the cutter bar assembly through the uppermost apertures, a maximum lift of the cutter bar is provided which in the preferred commercial embodiment is as much as 5½ to 6 inches. For the least depth of cut, the guide shoes may be entirely removed and the cutter bar allowed to ride upon the lower curved surface 32, in that case being raised above the ground level a distance of only approximately one inch, thereby securing a relatively close cutting operation.

The provision of a single central support for the cutter bar assembly is especially desirable in a device of this character inasmuch as it provides for great flexibility in the width of the cutter bar and in the width of swath which is cut thereby. Thus a standard tractor unit may be constructed for most convenient manual operation and control and assembled with cutter bars of varying width in accordance with the width of cut desired. This width is independent of the spacing of the wheels, and preferably is such as to be as great as or greater than the spacing of the wheels so that the wheels will run upon the material which has been cut by the cutter bar. In the device as shown the wheels have the maximum spacing of any part of the tractor unit and as this spacing is not in excess of the width of cut, the entire tractor operates substantially free of contact with any portion of the uncut standing growth of material on either side thereof. Thus the uncut material is not run down or bent over by any part of the tractor which operates wholly within the lateral boundaries of the cut swath. In actual operation of the device of the present invention it is found that the material as it is cut falls directly rearwardly of the cutter bar and in line with the wheels, and that such material as falls upon the central supporting member 26 falls to one side or the other thereof and is then caught by the wheels and drawn away from such support and thrown down onto the ground so that the machine tends constantly to keep itself clear of the cut material. The present device is further advantageous in that there is a substantial degree of flexibility provided in the cutter bar assembly with respect to the wheels and tractor unit, so that the cutter bar may accommodate itself as required to any unevenness occurring in the ground. Being in advance of the wheels, this action assures a uniformity of cut within reasonable operating limits, notwithstanding inequalities existing in the ground level.

Pivoted to the wheel brackets 12 as shown at 45 and extending rearwardly thereof inwardly of the wheels are a pair of handle bars 46 arranged for convenient operation, and spaced at the most convenient distance for the operator. A cross piece 47 preferably welded to the bars proper provides for strengthening the handle bar assembly. It will be evident that with this construction the spacing of the handle bars may be made to be that most convenient for use, and without reference to the actual width of the cutter bar assembly. Hence a cutter bar of a width substantially in excess of that spacing desired for the handle bars may be utilized if desired.

The power source preferably comprises an internal combustion engine 50 bolted to the upper face of channel 10, resilient pads 51 being provided between the motor and the channel in order to reduce vibration imparted to the latter. The internal combustion engine shown has a starting hub 52 extending forwardly thereof comprising a cylindrical surface provided with a notch therein for the reception of a cord, adapted to be wound upon the hub and manually drawn at right angles to the shaft in order to start the engine. The engine is likewise provided with a screen on its forward side for the reception of cooling air and in order to enclose and protect the starting hub and the air passage, a removable hood 53 is pivotally supported at 54 upon the forward side of the engine. In the starting operation, the hood may be opened to provide access to the hub 52, and thereafter is moved to the position shown where it effectively encloses the hub and prevents possible injury and access of foreign matter thereto. The hood is open on both its upper and lower ends, and thus does not interfere with the proper flow of cooling air into the engine.

In order to further reduce the vibration in the handle bars 46, the handle bars are resiliently connected with the motor casing 50 by means of rod 55 which is connected to lug 56 on the upper part of the casing through the provision of a pair of resilient springs 57 each fastened to the rod and engaging the lug adjustably between them. With this arrangement the handle bar assembly is adapted to pivot about its supports 45 against the springs 57, so that the handle bars in a sense float in the hands of the operator without transmitting the vibrations encountered in the frame during use. When however it is desired to lift the cutter head or to guide the mower in operation, movement of the handle bars sufficiently in one direction or the other effects compression in one of the springs and resultant tilting or guiding of the entire tractor.

Control of the speed of the motor is secured by means of a Bowden wire control 58 placed conveniently accessible to the hand of the operator, and communicating with the throttle upon the engine. The engine preferably contains magneto ignition and may be stopped by a short circuiter upon the spark plug.

The motor drive shaft is shown at 60 extending from the rear of the engine. Upon the shaft there is mounted a V-belt pulley 61 through which the driving power is transmitted. To the rear flange 11 of the frame member there is bolted a downwardly extending plate 62 which is provided with a bearing portion 63 serving to journal the driven shaft 64. Mounted upon the overhanging end of shaft 64 is pulley 65 having a V-groove in line with pulley 61 and adapted to be driven therefrom by means of V-belt 66. Pulley 65 is of larger diameter than the drive pulley 61 to provide for suitable speed reduction in the driving operation.

Clutch means are provided for controlling the effective driving relation between the engine and the driven shaft, this means preferably comprising an idler pulley 70 rotatably mounted upon an arm 71 which is pivoted at 72 to plate 62. The position of arm 71 is controlled by means of a link 73 connected to the manually operated lever 74 having a right angularly bent terminal portion 75 which pivotally receives the end of link 73. Upon rotation of lever 74, link 73 is pulled against the action of a resilient spring 76 to provide for yieldingly forcing the pulley into the tightened or driving position as shown in Fig. 5 where the slack in the belt is taken up and the amount of wrap upon the two pulleys is increased. In the final position of lever 74, the end portion 75 moves over center with respect to link 73, to thereby releasably retain the pulley in driving engagement; upon return of lever 74 to disengaged position, link 73 is released and the idler pulley is moved into a clearance position because slack is reestablished in the driving belt. A fixed pin 77 upon the opposite side of the belt tends to cause the belt to move upwardly around drive pulley 61 in such non-driving relationship to reduce the friction created thereby. A manually operable handle 76 is arranged upon lever 74 in convenient relation to handle bars 46.

Bolted to the lower side of frame 10 are two pairs of brackets 80 and 81 which provide respectively for journalling driven shafts 82 and 83. A drive pinion 84 is fastened to the inner end of shaft 64 and is adapted to engage with ring gear 85 rotatably supported upon shaft 83. To the face of ring gear 85 there is fastened the differential housing 86 which is rotatably mounted upon shaft 82. The differential housing carries the planetary gears 87 which mesh with the sun gears 88 fastened respectively to shafts 82 and 83, this gear assembly functioning as a differential to effect proper driving of the shafts 82 and 83 for operation of the tractor. Collars 89 adjustably fastened to shafts 82 and 83 cooperate with brackets 81 to control the clearance in the differential gearing assembly.

On the ends of the respective shafts 82 and 83 outwardly of the brackets 80, there are fastened drive sprockets 90 over which run sprocket chains 91 for driving engagement with sprocket wheels 92 fastened to the inner ends of the wheel axles 15. A shield 93 preferably encloses and protects each said sprocket chain and sprocket wheel, and an additional curved shield member 94 encloses and protects the above described gearing from receiving any of the cut material.

From the above description it will be apparent that the arrangement as thus described provides for the mounting of the driving gearing entirely separately from the wheels or their supports, and inasmuch as the driven shafts 82 and 83 terminate inwardly of wheel brackets 12, the entire assembly of differential and driving gearing may be removed without disturbing the wheel assembly. Similarly, if necessary to take up the slack in the sprocket chains 91 this may be accomplished without disturbing the assembled relationship of the differential and the drive shafts merely by removing the bolts 13 and placing shims between the frame 10 and the wheel brackets.

The drive for the cutter bar is secured from the same driven pulley 65 which provides for the operation of the tractor. For this purpose the hub of the pulley is provided with a rearwardly projecting eccentric crank pin 95. A crank arm 96 is removably received upon crank pin 95, the arm being formed with a yoke portion 97 in which is pivotally received the bearing member 98 adapted to be slidably received upon pin 95 in driving relation. In order to retain the bearing in such operative position, a plate 99 is resiliently fastened by spring means 99a to bearing member 98 and is formed with a depending flanged part adapted to engage in a groove formed in the end of the crank pin. This serves to retain the bearing in operative position to effect operation of the cutter bar. When it is desired to disconnect the drive from the cutter bar assembly as for example when it is desired to move the mower under its own power but without operation of the cutter thereof, the plate 99 is manually lifted against the action of spring 99a thereby freeing the flange from the cooperating groove and permitting the bearing to be moved out of engagement with the pin. It may be dropped into the dotted line position in Fig. 4 wherein the cutter bar drive is completely disconnected.

The plate 62 is formed with a pair of downwardly extending arms 100 which are provided with bosses 101 at their lower ends for receiving a cross shaft 102. Upon this shaft there is rotatably mounted the bell crank lever 103 having a universal coupling 104 for receiving connecting link 96. An operating rod 105 is connected to the other arm of the bell crank and extends forwardly toward the supporting member 26, and below and directly in alignment therewith so as to be covered and protected thereby. Link 105 connects with a second bell crank 106 suitably pivoted at 107 to the underside of frame member 26, and arranged to be oscillated in response to the reciprocating movement of link 105. An operating rod 108 is connected to the arm of bell crank 106, and extends outwardly to a position adjacent the end of the cutter bar assembly, thus extending at substantially right angles to operating rod 105. The cutter bar is provided with an upwardly extending pin 110 adjacent the end thereof, and beyond the last pressure plate 35 and stationary knife blade 34. Pin 110 has a groove 111 adjacent the upper end thereof and a spring finger 112 is pivoted to bar 108 as shown at 113, and adapted to be received within groove 111 to retain the link in operating relation with respect to the cutter bar. Fixed pin 114 thus serves to yieldably retain the spring finger in engagement with the groove. When however it is desired to remove the cutter bar for purposes of sharpening or the like, it is only necessary to manually withdraw the spring finger 112 from groove 111, this action permitting the upward withdrawal of the rod 110 from the cutter bar. Thereafter the cutter bar can be withdrawn laterally from the cutter assembly through aperture 41 in the guide shoe, the cutter bar assembly being supported independently of the ends thereof and there being no other operating connections or parts to offer obstruction to such withdrawal. Consequently the cutter bar may be immediately removed and replaced without the necessity for any disassembly or reassembly of operating parts of the device.

It will be further observed that inasmuch as the operating rod 108 is substantially parallel with the cutter bar assembly and positioned in close juxtaposition thereto, it does not interfere with the free falling of the cut material, nor does such material tend to pack up upon such rod. The material merely falls backwardly over such rod as the cutter bar assembly moves forward, and there is thus no tendency for the machine to interfere with the free falling of the cut material. Likewise the operating link 105 is properly and adequately protected from the falling of the material by reason of the central supporting bar 26 under which it extends.

The entire device thus presents a highly satisfactory and extremely simple arrangement of mower, having great flexibility both as to the depth of cut which is provided for, and likewise as to the width of swath which may be secured. In the latter respect the cutter bar may be lengthened out as desired, and made substantially wider than the tread of the wheels, the wheels thus running only over the area which has been cut, and by their action as above described tending to throw the cut material downwardly toward the ground, and to consequently keep the cutter support clear of material which may fall thereupon. The device is conveniently operated by the user, the handle bars being spaced at a convenient width, irrespective of the actual width of cut, and likewise mounted for free and non-vibrating support notwithstanding the normal vibrations encountered in use. The device thus provides for great flexibility in use, making it possible to utilize a standard tractor unit which is adapted to receive any of a series of cutter bar assemblies of varying width, or to receive other tools or implements. Further the provision of wheels extending outwardly beyond the frame members for supporting the same assures against the collection of cut material upon the frame, since the action of the wheels as above described is to tend to throw any cut material which falls upon the frame of the machine downwardly to the ground.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A mower of the character described which comprises a two wheel tractor unit including a transverse frame member, wheel brackets depending downwardly from said frame member adjacent each end thereof, wheels mounted on said frame brackets outwardly of said frame member and said brackets, handle bar means carried by said frame inwardly of the wheels providing for guiding said mower in operation, a cutter bar assembly having a cutting width as great or greater than the spacing of said wheels, said cutter bar assembly having guide shoes for guiding the cutter bar over the ground at a predetermined desired height and located substantially in the plane in which the cutting action occurs, a supporting member for supporting said cutter bar assembly forwardly of said frame in fixed relation thereto with the outer ends of said cutter bar extending at least into the planes of said wheels, motive power means mounted on the upper side of said frame member, transmission means including a differential means and a driven shaft extending outwardly toward said wheel brackets at either side thereof mounted in protected positioning on the underside of said frame member, means supporting said transmission means for removal and replacement independently of the mounting for said wheels, means for driving said transmission means from said motive power means, means providing a removable driving connection between each of said wheels and the adjacent driven shaft, and drive means on said frame forming a fixed driving connection to said cutter bar assembly.

2. A mower of the character described comprising a frame, wheel brackets depending from said frame, wheels rotatably carried by said brackets outwardly thereof and outwardly of said frame, axles for said wheels extending inside of said brackets, motive power means mounted on the upper side of said frame, transmission means comprising a pair of driven shafts extending transversely of the mower in protected positioning under said frame at either side thereof and terminating in substantially the vertical planes passing through the inner ends of said wheel axles, means for mounting said driven shafts on the underside of said frame independently of said wheel brackets, means including a differential drive mounted on the underside of said frame providing for operating said driven shafts from said motive power source, and means located in protected positioning under said frame inside of said wheel brackets and within the vertical projection of said frame providing a driving connection between each of said wheel axles and its respective driven shaft, said transmission means being removable and replaceable upon said frame independently of the mounting of said wheels.

3. A mower of the character described comprising a transverse frame member, wheel brackets depending downwardly from said frame member adjacent the ends thereof, wheels for supporting said frame member rotatably carried by said brackets outwardly thereof, motive power means mounted on the upper side of said frame member, a driven shaft operated by said motive power means, a differential drive mounted on the underside of said frame member substantially centrally thereof and operated by said driven shaft, means located inside of said wheel brackets and within the vertical projection of said frame member for effecting a driving connection between said wheels and said differential drive, a cutter bar assembly carried by said frame member, and means including an eccentric crank operated by said motive power means and a bell crank lever mechanism operated by said eccentric crank for effecting reciprocating drive of said cutter bar assembly.

4. A mower of the character described comprising a transverse frame member, wheel brackets depending downwardly from said frame member at each end thereof, wheels for supporting said frame member rotatably carried by said brackets, motive power means mounted on the upper side of said frame member, differential drive means located on the underside of said frame member, means for effecting operation of said differential drive means from said motive power means, driving means located in protected positioning under said frame member and inside of said wheel brackets for effecting a driving connection between said wheels and said differential drive means, both said differential drive means and said last mentioned driving means being located within the vertical projection of said transverse member, and means for supporting said differential drive means and said connecting drive means for removal and replacement independently of the mounting for said wheels.

5. A mower of the character described comprising a transverse frame member, wheel brackets depending downwardly from said frame member at each end, wheels rotatably carried by said brackets outwardly thereof, axles for said wheels extending through said brackets and inwardly of the brackets, drive sprockets mounted on said axles inwardly of said brackets, motive power means mounted on the upper side of said frame member, differential means operated by said motive power means positioned substantially centrally of said frame member on the underside thereof, drive shafts extending outwardly from opposite sides of said differential means on the underside of said frame member and terminating inwardly of said wheel brackets, means positioned inwardly of said wheel brackets for providing a driving connection between said drive shafts and said sprockets on said wheel axles, and means for supporting said differential means and said drive shafts for removal and replacement thereof independently of the mounting for said wheels.

NELSON M. RIEGER.